United States Patent
Aoki et al.

(10) Patent No.: US 6,169,815 B1
(45) Date of Patent: Jan. 2, 2001

(54) METHOD FOR RETOUCHING PHOTOGRAPH AND MATERIAL USED FOR THE SAME

(76) Inventors: Akira Aoki, 2-29, Ida 1-chome, Nakahara-ku, Kawasaki-shi, Kanagawa; Akihiko Tanioka, 2-3-16-417, Ishikawa-cho, Ota-ku, Tokyo, both of (JP)

( * ) Notice: Under 35 U.S.C. 154(b), the term of this patent shall be extended for 0 days.

(21) Appl. No.: 09/077,816
(22) PCT Filed: Nov. 27, 1996
(86) PCT No.: PCT/JP96/03473
   § 371 Date: May 22, 1998
   § 102(e) Date: May 22, 1998
(87) PCT Pub. No.: WO97/20428
   PCT Pub. Date: Jun. 5, 1997

(30) Foreign Application Priority Data

| Nov. 27, 1995 | (JP) | 7-307812 |
| Nov. 27, 1995 | (JP) | 7-307859 |
| Nov. 30, 1995 | (JP) | 7-312934 |
| Jan. 29, 1996 | (JP) | 8-012837 |
| Jul. 10, 1996 | (JP) | 8-180439 |

(51) Int. Cl.$^7$ .................................................. G06K 9/00
(52) U.S. Cl. .......................................... 382/100; 396/655
(58) Field of Search .......................... 382/100, 112, 382/167, 282, 283, 309, 311; 396/655; 399/6, 39, 72, 147; 430/13, 14, 15, 257, 359; 358/506, 518, 527, 531, 537, 538, 540

(56) References Cited

U.S. PATENT DOCUMENTS

| 3,161,510 | * | 12/1964 | Gosmann | 96/43 |
| 3,276,870 | * | 10/1966 | Bitting et al. | 96/27 |
| 4,538,182 | * | 8/1985 | Saito et al. | 358/280 |
| 4,670,794 | * | 6/1987 | Araki et al. | 358/293 |
| 5,745,248 | * | 4/1998 | Nickerson | 358/296 |
| 5,852,675 | * | 12/1998 | Matsuo et al. | 382/167 |
| 6,027,263 | * | 2/2000 | Tawa | 396/655 |

FOREIGN PATENT DOCUMENTS

| 62-293882 | 12/1987 | (JP) | H04N 1/21 |
| 2-124985 | 5/1990 | (JP) | C09D 11/16 |
| 4-145764 | 5/1992 | (JP) | H04N 1/387 |
| 5-34939 | 5/1993 | (JP) | A47B 97/00 |
| 6-102394 | 12/1994 | (JP) | B43L 1/04 |

\* cited by examiner

Primary Examiner—Andrew W. Johns
(74) Attorney, Agent, or Firm—Kenyon & Kenyon

(57) ABSTRACT

The image surface of an original photograph is covered with a transparent plastic film and the image is corrected by painting on the transparent film so that a combined image material is made. Then this combined image material is digitized with scanning equipment and the resulting digital data is stored in a computer. Thereafter, conventional computer image processing technology is applied to modify the digital image displayed on the monitor of the computer.

9 Claims, 6 Drawing Sheets

METHOD FOR RETOUCHING PHOTOGRAPH AND MATERIAL USED FOR THE SAME

TECHNICAL FIELD

The present relates to an improved method of correcting a photograph by scanning the photograph and storing it in a computer as digital data, correcting and storing the picture on the monitor by operations through the computer, and then preparing a corrected photograph by the corrected digital data and to materials used only for efficiently performing that work.

BACKGROUND ART

When developing and processing a photographic film to prepare a print, both professional photographers and non-professional photographers correct the photograph when necessary by the use of filters, adjustment of the printing time, etc. This correction work had mainly been to adjust the color of the image, correct the brightness, and sometimes correct the sharpness of the image. The recent rapid advances made in computer image processing technology, however, have had a major impact on the correction of photographs as performed in the past and have led to revoluntary advances in correction of photographs. They have expanded the range of utilization of photographs to fields in which entry had previously been impossible such as paintings and have contributed greatly to the improvement of the efficiency and quality of work in fields such as advertising and architecture in which photographs had already been actively used. Computer image processing can also be expected to be used as innovative technology in the field of general documentary photographs by nonprofessional photographers.

Computer image processing is for example well known from computers developed by Macintosh of the U.S. used with the software of Adobe Systems Inc. When all the peripherals are included, however, the system cost becomes considerably high. When considering the capital cost required for ensuring a high quality of corrected photographs, the general photographer would find it impossible to obtain the equipment and use the technology directly.

Further, when trying to apply computer image processing to actual correction of photographs, considering the time required and consequently the substantive cost, it may be well understood that there are actually great limitations in use of this technology for correcting the tone and composition of a photograph. On the other hand, it is known to express colors quantitatively based on a chromaticity diagram or the RGB system or YMCK system, but it may be said without exaggeration that few if any can judge from these quantitative indications what a color will turn out to be when viewed by the naked eye. In the case of the above mentioned computer image processing, work is performed while checking by the naked eye the changes in color of the photograph scanned into the computer and shown on the monitor, so the problem can be solved here, but when the person desiring to correct a photograph and the person actually performing the computer image processing differ, specifically when entrusting the correction of a photograph to a professional image processing company (third party), there is a problem in how to designate the correction work when one is not able to directly assist in the work of the computer image processing company.

DISCLOSURE OF THE INVENTION

To solve the above practical problem, an object of the present invention is to provide a method for considerably enhancing the efficiency of work when using computer image processing for correction of a photograph and thereby enabling the easy use of the superior effects of computer image processing and materials used only for effectively working this method.

To attain this object, there is provided a method of correction of a photograph by scanning the photograph and storing it as digital data in a computer and preparing a corrected photograph by operations on the computer, comprising not scanning the original picture and storing it as digital data in the computer, but being able to scan a picture corrected by the photographer himself and storing in the computer the digital data obtained by scanning in accordance with the color or composition of the corrected picture, and for example making further corrections to the picture displayed on the monitor by a known method of computer image processing. This is far more efficient than the conventional method and enables preparation of a photograph of a content corrected as desired by the photographer with a high precision. This is the basic technical idea behind the present invention. To realize this basic technical idea, a sheet of a transparent plastic film of a size able to sufficiently cover the photograph is prepared, this sheet is affixed to the picture side of the original photograph to prepare a composite picture sheet, desired corrections are made using a coloring instrument from the top of the composite picture sheet to prepare a corrected composite picture sheet, the picture of the corrected composite picture sheet is scanned from the surface of the transparent sheet and stored in a computer as digital data, known computer image processing is used to make further corrections to the picture on the monitor, the corrected digital data is stored in the computer, and a corrected photograph is prepared from the stored corrected digital data by a known technical method. This is the means for achieving the object (method) of the present invention.

Here, "correction of the photograph" includes partial or full correction of the colors of the photograph, partial change or erasure of the composition of the photograph, and addition and synthesis of parts of other photographs. The "original photograph" may be either a print or a positive film.

In the above work for correction of the photograph, preparation of the corrected composite picture sheet requires the transparent plastic film for covering the picture side of the original photograph and coloring instruments for drawing the corrected image on the surface. A coloring agent is required which does not deform the plastic film and which enables gradations of color like when brushing paint on paper. The set of materials comprised of the two can be achieved by use of the materials of the configurations explained below.

EFFECTS OF THE INVENTION

According to the present invention, it is possible to provide a method for the efficient and effective correction (erasure, addition, or correction of color of some elements) of a picture by computer image processing and materials for use for that method.

Further, according to the present invention, it is possible to provide a method of computer image processing enabling easy handling of a request for correction of a silver salt photograph from a third party of a location unrelated with the work place and materials for use for that method.

BRIEF DESCRIPTION OF THE DRAWINGS

FIGS. 1A, 1B, and 1C are views explaining the configuration of a composite sheet, wherein FIG. 1A shows the elements of the composite picture sheet, that is, the original photograph and the transparent plastic sheet, FIG. 1B shows a cross-section of the composite picture sheet in the overlaid state, and FIG. 1C shows a corrected composite picture sheet;

FIGS. 5A and 5B are views of another example of use of the coloring materials according to the present invention for a photograph of a bowl of fruit, in which FIG. 5A shows an original photograph and FIG. 5B shows a digital photograph prepared according to the present invention;

FIGS. 6A and 6B are views for explaining another example of use of the coloring materials according to the present invention, in which FIG. 5A shows an original photograph and FIG. 5B shows a digital photograph prepared according to the present invention; and FIG. 7 is a cross-section of another embodiment of a photograph correction sheet used for working the method of the present invention.

DETAILED DESCRIPTION OF THE INVENTION

The configuration and effects of the present invention will be explained in further detail below by the following examples.

The explanation will be divided into two parts: part 1 (method of present invention) and part 2 (materials used for method of present invention).

Part 1 (Method of Present Invention)

Figure 1A:
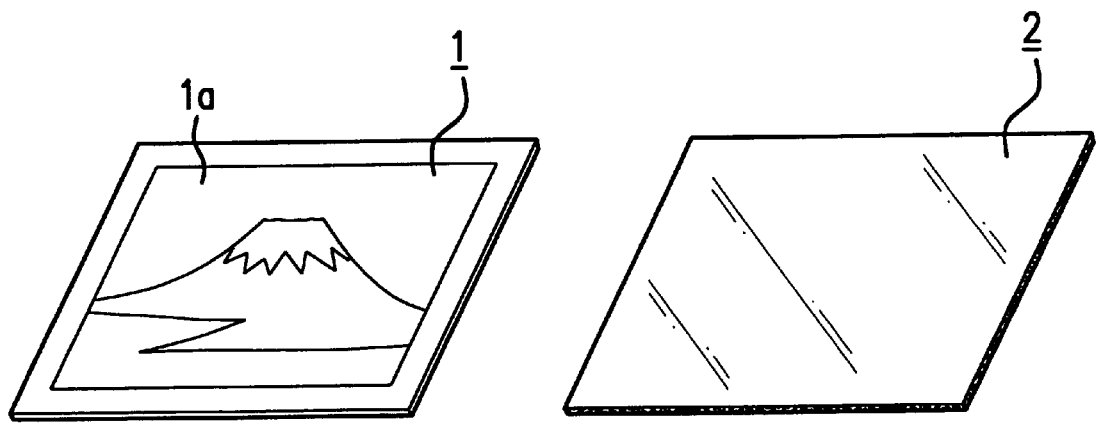
Figure 1B:
Figure 1C:
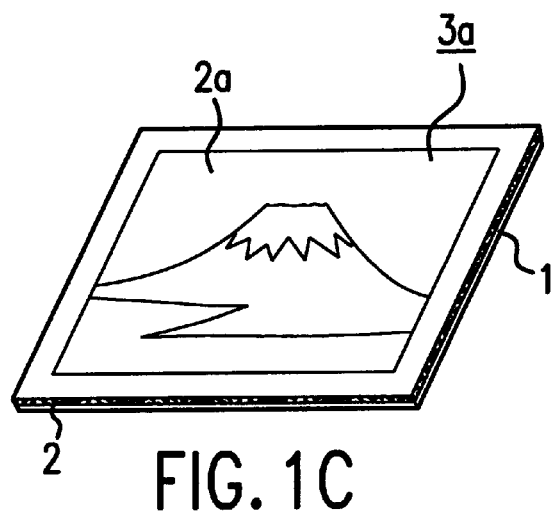
Figure 2:
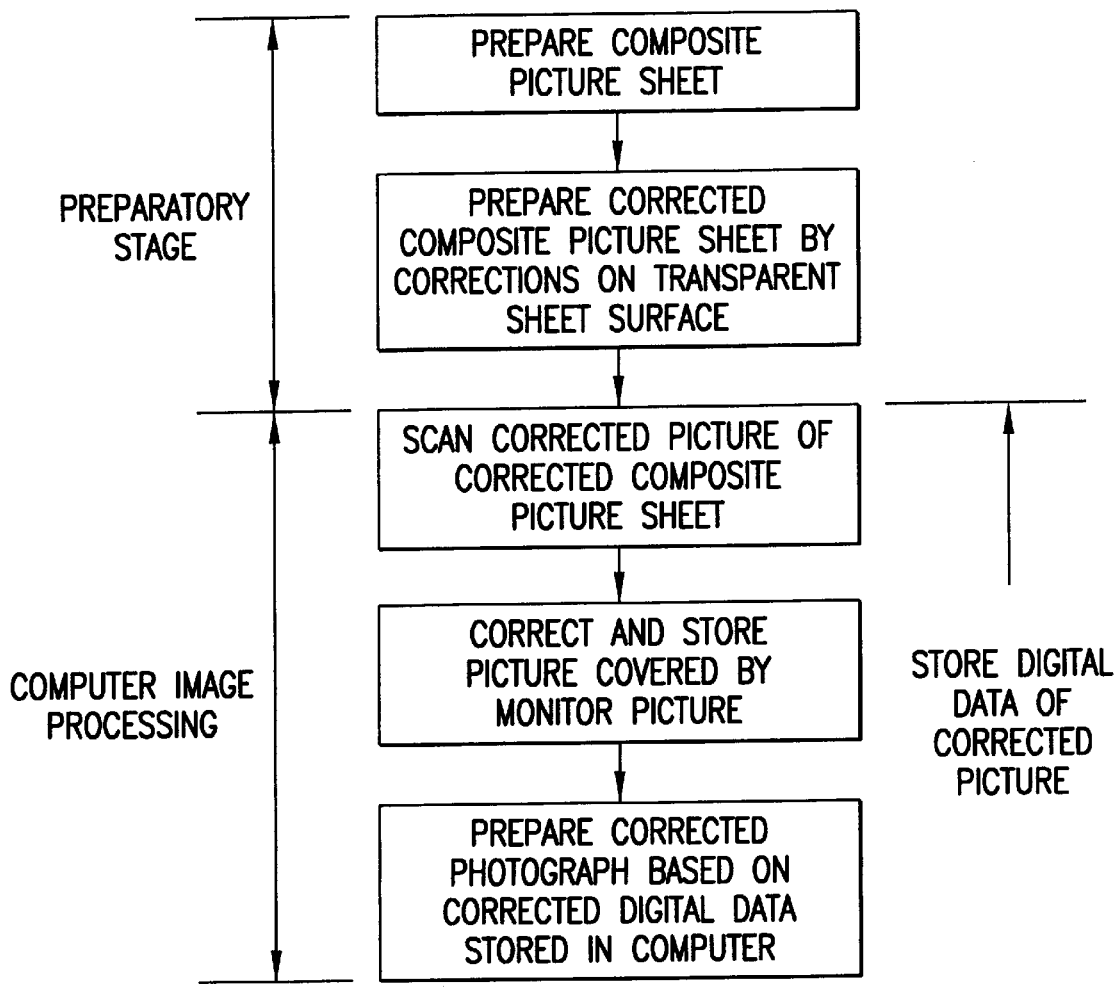

[Example 1] (See FIGS. 1A to 1C)

With the objective of correcting the color of the sky forming the background in a cabinet size print of a photograph of Mt. Fuji to a specific dark navy blue, as shown in FIG. 1A, a transparent sheet (2) made of 50 micron thick polyvinyl alcohol resin and of a size sufficient to cover the cabinet size print (1) was laid over the print (1) in a fixed manner to cover the photograph and thereby prepare the composite picture sheet (3) shown in FIG. 1B. As shown in FIG. 1C, the region (1a) of the sky constituting the background portion of Mt. Fuji on the surface of the transparent sheet (2) was colored to correct it to the desired color using a water color resulting in the corrected color portion (2a) and thereby prepare the corrected composite picture sheet (3a). The picture side of the corrected composite picture sheet (3a) was scanned by known image processing and stored as digital data in a computer. The color and composition of the picture displayed on the monitor based on the stored data was finely adjusted, the corrected digital data was stored in the computer, and a corrected digital photograph was then prepared by a known method based on the correct digital data. The "known method" referred to here is for example the method using the computer image processing technology developed by the above-mentioned American company, more specifically, for example, the method of image processing described in detail in Adobe Photoshop 3.0J (registered trademark).

Figure 3:
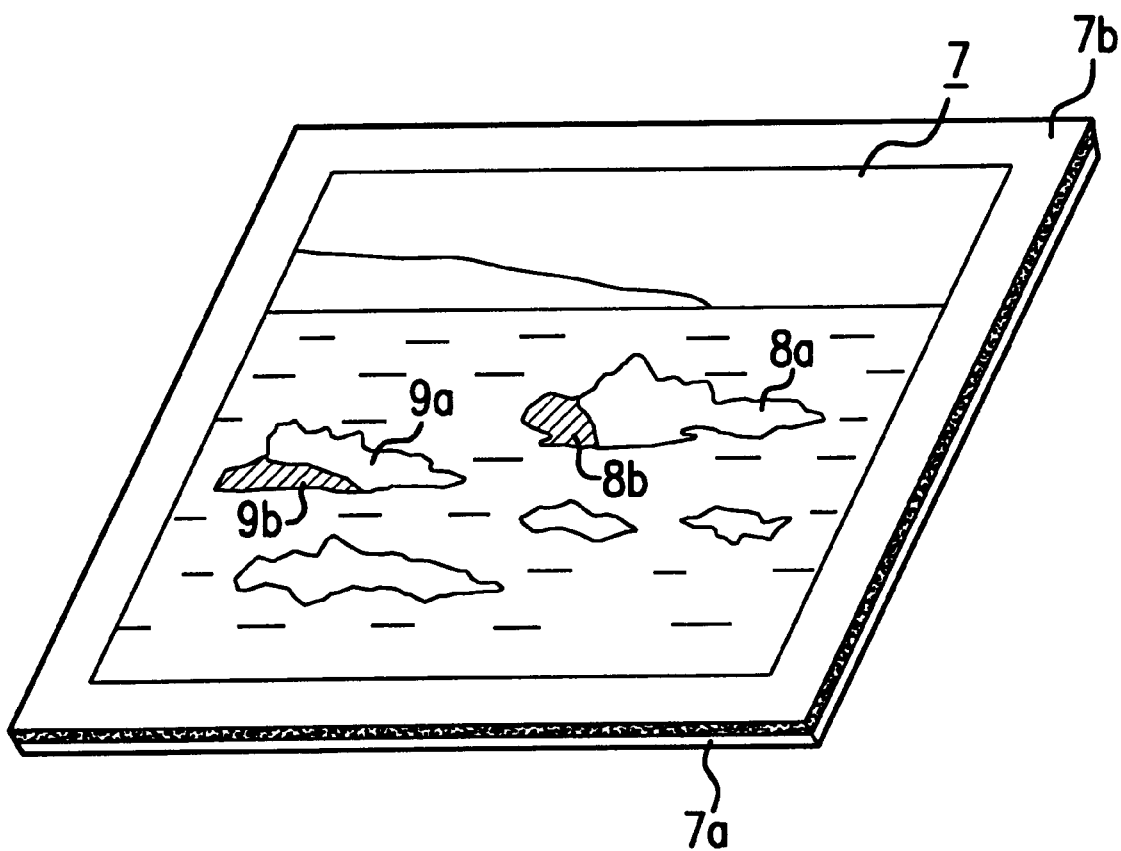
FIG. 3 is a flow chart showing a second basic step for working the method of the present invention.

The steps of this work are shown in the flow chart of FIG. 3.

Figure 4A:
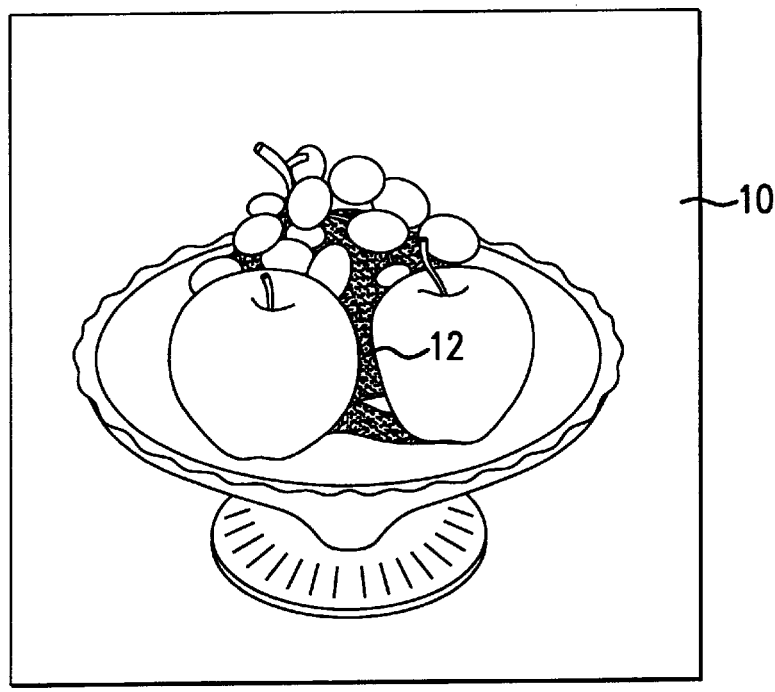
FIG. 4 is a perspective view of a corrected composite picture sheet marked by sample colors for correction of parts of the elements among the component elements of the original photograph.
Figure 4B:
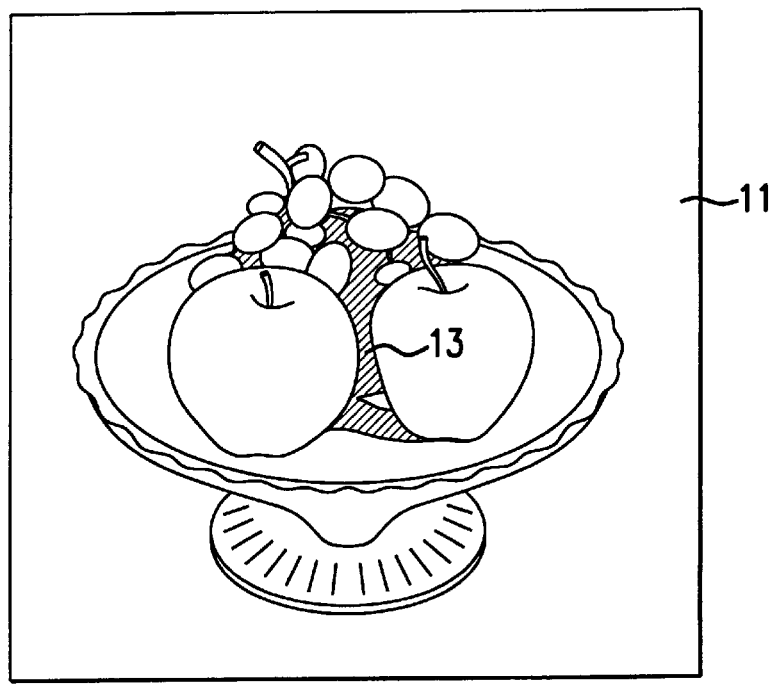

[Example 2] (See FIG. 4)

Shinji Murase of Hokkaido's Monbetsu city is a famous painter of icebergs. As is well known, numerous photographers have traveled on photo shoots to the Okhotsk coast of Hokkaido to try to capture photographs of the dream-like icebergs depicted in Murase's paintings. The weather conditions at the time of the shoots, however, have a major influence on the color of the subject, so in practice it was almost impossible to achieve that objective.

Computer image processing, however, has now made it possible to produce photographs meeting this objective. First, a photograph (of an iceberg) with a suitable composition is taken and a print is made. This photograph is used as a base, then a transparent film (50 microns) made of a polyvinyl alcohol resin is covered over the picture side of the print in a fixed manner to prepare a composite picture sheet. A water color is then applied to the surface of the polyvinyl alcohol resin film to correct the color of elements requiring corection among the elements comprising the image and thereby prepare a corrected composite picture sheet. The composite picture sheet is scanned and stored in a computer as digital data, the picture on the monitor is further corrected in detail and stored as corrected digital data in the computer, and a corrected photograph is then prepared from the digital data stored in the computer.

Since the correction of the color of icebergs is extremely delicate work, it is also effective to correct just parts (8b, 9b) of the image elements (8a, 9a) to be corrected, as shown in FIG. 4, by the desired sample colors on the composite picture sheet, obtained by covering the picture side of a photograph (7a) by the above plastic transparent film (7b), so as to prepare the corrected composite picture sheet (7), make corrections to the portions (8b, 9b) to be corrected from the picture on the monitor by computer image processing based on the sample colors of the picture on the monitor at the stage of computer image processing, and store the corrected monitor picture in the computer as digital data.

In the above examples, the explanation was made of the case of covering the surface of the original photograph with a transparent plastic sheet to prepare a composite picture sheet and making corrections on the transparent sheet, but of course it is possible to obtain the same effect as in the above examples even if one coats a melted transparent plastic material on the surface of the correction portion of the original photograph and, after a film of the plastic material is formed at that portion, colors on the film.

Part 2 [Materials Used for Working Method of Present Invention]

In the above Examples 1 and 2, the plastic film sheet used for the correction of the photograph was hydrophilic and swellable. Since a water color was used, the hue of the corrected picture was whitish and trouble was required in the fine corrections of the digital picture. Therefore, as explained previously, materials have been developed with special performance for practical application of the computer photo processing method. The basic technical ideas are to use a hydrophobic plastic film sheet as the material used for the above-mentioned photo processing technique and to combine with this film sheet paints which are hydrophilic and enable color gradation. Further, it is necessary that the color not become whitish after the corrected picture is drawn on the plastic film sheet.

To realize these technical ideas, the inventors studied various hydrophobic plastic film sheets. As a result, they learned that their objective could be achieved by using them with a coloring material comprising a mixture of a paint containing a pigment or a direct dye or other dye and a surfactant (hereinafter simply referred to as a special paint) as will be explained in the following embodiments. Further, they learned that the above objective could also be achieved by, instead of mixing the surfactant with the paint in advance, coating the surfactant on the surface of the hydrophobic plastic film sheet and mixing a paint containing a pigment or direct dye or other dye with the surfactant on the surface of the plastic film sheet.

Figure 5A:
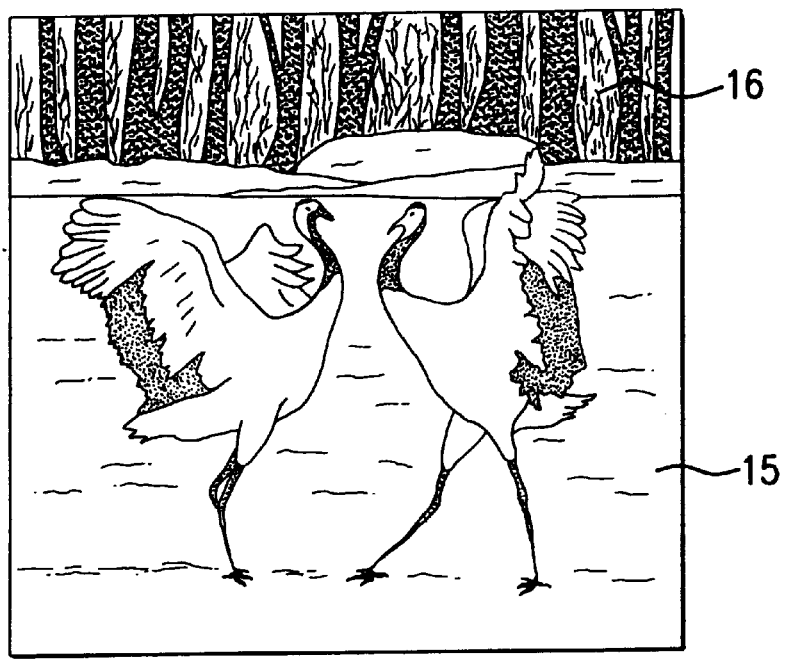
Figure 5B:
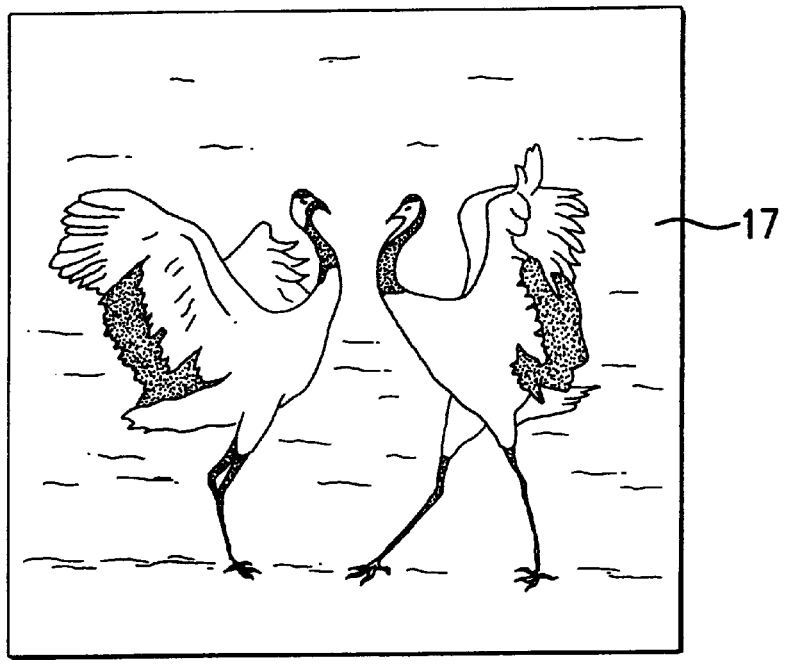

[Example 3] (See FIGS. 5A and 5B)

FIG. 5A shows a print of a silver salt photograph (10) of an arrangement of an apple, pear, and grapes in a decorative bowl, while FIG. 5B shows a digital photograph 11 obtained by computer photo processing using the materials of the present invention. In the silver salt photograph (print) (10) of FIG. 5A, the dark black color of the shaded portion 12 is strong and it was necessary to correct the color balance with the colors of the main component elements of the photograph, that is, the apple, pear, and grapes.

The surface of the silver salt photograph was covered by a hydrophobic plastic film sheet in a fixed manner to prepare a correction sheet. The shaded portion 12 of the silver salt photograph was colored from above to a predetermined color by a paint containing the pigment or dye and surfactant to prepare the corrected picture sheet. This corrected picture sheet was scanned and stored as digital data in the computer, then a digital photograph (11) (FIG. 5B) including the corrections by the method of the present invention was prepared. In this example, since a transparent sheet made of a polyester resin is used, even if coloring by a water color, there is no swelling of the sheet surface and so the result of the scanning is good. Further, since use is made of a commercially available paint comprised of a mixture of a direct dye and surfactant (10 wt %), suitable gradations are possible and correction to a shaded portion (13) satisfactory in color balance is possible. Further, if this technique is not used and the shaded portion (12) is corrected by the known computer image processing technique, the work becomes one of trial-and-error and a considerably long work time is needed for obtaining a satisfactory result. Due to the remarkable reduction in the work time, there is enough leeway in time to make additional corrections to the photograph, for example, in this case, additional correction of the color of the apple, pear, and grapes by known computer image processing techniques—which provides the chance for preparing a photograph with much higher aesthetics.

The percentage of the surfactant constituting part of the paint may be 5 to 30 percent with respect to the dye or pigment. From the viewpoint of the gradations of color, a better result can be obtained by using a dye.

Examples of the paint, dye, surfactant, and plastic sheet are given below:

Paint
  Water color paints etc.
Dye
  Reds
    Congo Red, Orange 11, etc.
  Blues
    Methylene Blue, Chlorazol Sky Blue FF, etc.
  Yellows
    Auramine, Butter Yellow, etc.
Surfactant
  Anionic
    Primary alkyl sulfate esters, alkyl benzene sulfonate, monoglyceride sulfate esters, etc.
  Cationic
    Alkyl pyridinium chloride etc.
  Nonionic
    Polyethylene ethers etc.
Plastic sheet
  Polyethylene terephthalate, polycarbonate, polymethylmethacrylate, vinyl chloride, polypropylene, etc.

Figure 6:
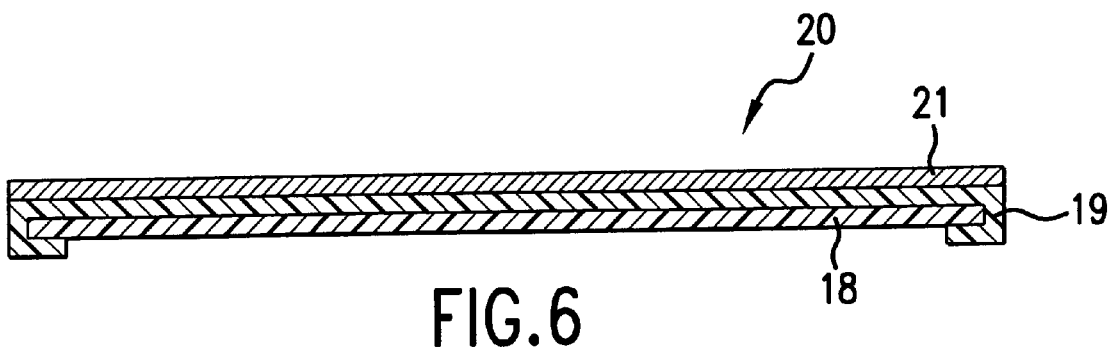

[Example 4] (See FIGS. 6A and 6B)

Japanese cranes have long been used as the subject of paintings due to their rarity. Numerous famous paintings are outstanding. FIG. 6A shows a silver salt print (15) of a courtship scene of a cranes taken by one of the present inventors. Here, if the background forest portion (16) were deleted and replaced by a snow field, the work would become more valuable aesthetically judging from conventional standards of art appreciation. FIG. 6B shows the digital photograph (17) obtained by correction by known computer image processing. In this case, with the known "stamp tool" method, considerable time is required for the image processing. Also, trouble is required for adjustment of the balance of color with the other photograph elements.

As opposed to this, if the materials according to the present invention are used, it is possible to prepare a digital photograph (17) of a desired quality extremely efficiently compared with the case of the known computer image processing techniques. From this, it will be understood that the materials according to the present invention can be extremely effectively used when a person at a location away from the image processing specialist requests correction of a silver salt photograph, that is, an original photograph, by computer image processing. That is, assuming for example that a photographer on location (Kushiro city) requests such image processing to a specialist in a city other than Kushiro, there is some question as to if a simple instruction of "delete the forest forming the simple background and replace it with a snow field" would actually result in a corrected photograph acceptable to the photographer. Even looking just at the balance of color between the snow field replacing the forest and the snow field of other portions, clearly it is not possible to suitably convey the intention of the photographer.

As opposed to this, by using the materials of the present invention to prepare a corrected composite picture sheet as explained above and requesting correction of the picture to a specialist attaching this corrected composite picture sheet, not only is it possible to reliably obtain a corrected photograph as desired by the person making the request, but it is also possible to remarkably cut the cost of image processing.

[Example 5] (See FIG. 7)

In the above Example 4, the surfactant was included in the paint in advance. It is also possible however to coat the surfactant in advance on the surface of the hydrophobic plastic film sheet and make the surfactant mix with the paint on the hydrophobic plastic film sheet.

FIG. 7 is a cross-sectional view of a corrected composite picture sheet (20) comprised of a silver salt photographic (18) covered on the picture side in a fixed manner with a hydrophobic plastic film sheet (19). On the surface of the hydrophobic plastic film sheet (19) is formed a surfactant layer (21) obtained by coating and drying a surfactant. In the case of this example, as the paint, use is made of a paint comprised of an ordinary pigment or dye not including a surfactant. If the paint dissolved in water is brushed on the hydrophobic plastic film sheet (19), the paint will dissolve the surfactant layer (21) and the paint and surfactant will be mixed, so it is possible to color the plastic film sheet (19) even using an ordinary paint not containing a surfactant. Further, by rubbing the brush on the sheet several times, it is possible to mix the paint and the surfactant well.

In the above explanation of the examples, the drawings referred to were color photographs, that is, silver salt photographs, and digital photographs converted to black and white drawings for convenience.

We claim:

1. A method of correction of a photograph comprising:

preparing a composite picture sheet comprised of a photograph used as an original picture and a transparent sheet laid over said photograph in a fixed state, preparing a corrected composite picture sheet having a composite picture by using a coloring material to make desired corrections to the picture on the transparent sheet, and scanning the composite picture of the thus prepared corrected composite picture sheet and storing said composite picture as digital data in a computer, displaying said composite picture on a monitor;

operating the computer to adjust the composition and color formulation of the picture elements of the picture on the monitor over pixel units to generate and store corrected digital data, and preparing a photograph from the corrected digital data stored in the computer.

2. A method of correction of a photograph as set forth in claim 1, comprising correcting part of elements of the picture when preparing said corrected composite picture sheet.

3. A method of correction of a photograph as set forth in claim 1, wherein the correction of the picture in preparing said corrected composite picture sheet includes partial deletion of the original photograph.

4. A set of materials comprising a paint and a transparent hydrophobic plastic sheet for use for only the method of computer image processing of claim 1, said set of materials characterized in that the paint is comprised of a pigment or a dye and a surfactant.

5. A set of materials comprising a paint and a transparent hydrophobic plastic sheet for use for only the method of computer image processing of claim 1, said set of materials characterized in that the plastic sheet is a plastic sheet coated with a surfactant on its surface.

6. A set of materials comprising a paint and a transparent plastic sheet for use in the method of computer image processing of claim 1, said set of materials characterized in at least one of said paint and said transparent plastic sheet has a surfactant and said plastic sheet is hydrophobic.

7. A method of correction of a photograph as set forth in claim 1, wherein said transparent sheet is a hydrophobic plastic sheet and said coloring material contains a surfactant.

8. A method of correction of a photograph as set forth in claim 1, wherein said transparent sheet is a hydrophobic plastic sheet coated with a surfactant on its surface.

9. A method of correction of a photograph as set forth in claim 1, wherein said corrected composite picture sheet is prepared by corrections using a surfactant for at least one of the surface of the transparent sheet of the composite picture sheet and the coloring material and said transparent sheet is hydrophobic.

* * * * *